(12) United States Patent
Wang

(10) Patent No.: US 11,537,267 B2
(45) Date of Patent: Dec. 27, 2022

(54) METHOD AND DEVICE FOR SEARCH PAGE INTERACTION, TERMINAL AND STORAGE MEDIUM

(71) Applicant: Beijing Microlive Vision Technology Co., Ltd., Beijing (CN)

(72) Inventor: Xiao Wang, Beijing (CN)

(73) Assignee: BEIJING MICROLIVE VISION TECHNOLOGY CO., LTD., Beijing (CN)

( * ) Notice: Subject to any disclaimer, the term of this patent is extended or adjusted under 35 U.S.C. 154(b) by 83 days.

(21) Appl. No.: 16/864,068

(22) Filed: Apr. 30, 2020

(65) Prior Publication Data

US 2020/0257414 A1    Aug. 13, 2020

Related U.S. Application Data

(63) Continuation of application No. PCT/CN2018/124774, filed on Dec. 28, 2018.

(30) Foreign Application Priority Data

Jul. 6, 2018    (CN) .......................... 201810738485.2

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC .. G06F 3/0482; G06F 3/04817; G06F 16/735; G06F 3/04855; G06F 3/04842;
(Continued)

(56) References Cited

U.S. PATENT DOCUMENTS 8,078,603 B1 *  12/2011  Chandratillake ....... G06F 16/74
                                                            707/706
10,298,874 B1 *  5/2019  Lewis ................ H04N 21/2547
(Continued)

FOREIGN PATENT DOCUMENTS

CN        104378578 A      2/2015
CN        105900088 A      8/2016
(Continued)

OTHER PUBLICATIONS

Heather Lane, Netflix Tutorial, May 9, 2014, YouTube, https://www.youtube.com/watch?v=cF8SgrQJtBk.*
(Continued)

*Primary Examiner* — Mohamed Abou El Seoud
(74) *Attorney, Agent, or Firm* — BakerHostetler

(57) ABSTRACT

Techniques for searching page interaction are described herein. The disclosed techniques include in response to a first preset operation on a search control in a current display interface, switching the current display interface to a search interface and displaying at least one subject of recommended content in the search interface and displaying a dynamic thumbnail of at least one video corresponding to each subject of recommended content under the subject of recommended content; in response to a second preset operation on a target subject of recommended content, jumping to a detail page corresponding to the target subject of recommended content; and in response to a third preset operation on a dynamic thumbnail of a target video, jumping to a play interface of the target video.

20 Claims, 8 Drawing Sheets

(51) Int. Cl.
*G06F 16/738* (2019.01)
*G06F 16/735* (2019.01)
*G06F 3/04817* (2022.01)
*G06F 3/04842* (2022.01)
*G06F 3/04855* (2022.01)

(52) U.S. Cl.
CPC ........ *G06F 3/04855* (2013.01); *G06F 16/735* (2019.01); *G06F 16/738* (2019.01)

(58) Field of Classification Search
CPC .. G06F 16/738; G06F 3/0481; G06F 16/9535; G06F 3/048; G06F 16/40; G06F 16/743; G06F 16/583; G06F 16/248; G06F 16/438; G06F 16/4393; G06F 16/54; G06F 16/745; G06F 16/24; G06F 3/0485; G06F 9/451; G06F 3/0483; G06F 3/04883; H04N 21/4312; H04N 21/47202; H04N 21/4821; H04N 21/8549; H04N 5/445; H04N 21/47; H04N 21/482; H04N 21/4316; H04N 21/42204; H04N 21/4722; H04N 21/4622; H04N 21/4532; H04N 21/472; H04N 21/8173; H04N 21/4725
See application file for complete search history.

(56) References Cited

U.S. PATENT DOCUMENTS

| | | | |
|---|---|---|---|
| 2015/0317132 A1 | 11/2015 | Rempell et al. | |
| 2018/0199110 A1* | 7/2018 | Cormican | ............ H04N 21/816 |
| 2019/0012059 A1* | 1/2019 | Kwon | ................... G06F 3/0481 |

FOREIGN PATENT DOCUMENTS

| | | |
|---|---|---|
| CN | 106096031 A | 11/2016 |
| CN | 107608990 A | 1/2018 |
| CN | 108984081 A | 12/2018 |
| JP | 2001-028010 A | 1/2001 |
| JP | 2010-250448 A | 11/2010 |

OTHER PUBLICATIONS

Supreme Guru Tech,Netflix Tutorial | 2018 | Beginners Guide, Feb. 21, 2018, YouTube, https://www.youtube.com/watch?v=XD_ljJ0ymOQ.*
Baidu, How do Douyin challenge, Nov. 8, 2017.*
Techvilla, How to Use Cheez App, kaise use kare , download video, Dec. 25, 2017, YouTube, https://www.youtube.com/watch?v=7k_GTZpdrOw (Year: 2017).*
BWOne, Prime Instant Video On The Amazon Kindle Fire—BWOne.com, Nov. 17, 2011, YouTube, https://www.youtube.com/watch?v=iKf6aXaEVol (Year: 2011).*
International Patent Application No. PCT/CN2018/124774; Int'l Search Report; dated Apr. 8, 2019; 2 pages.
https://jingyan.baidu.com/article/d5c4b52b9f4b58da560dc5fl.html—website has now been deleted.
https://jingyan.baidu.com/article/f3e34a12fd86fff5eb653515.html; "How to set the cover of Douyin Video to be static-Baidu Experience"; Jan. 2018; accessed Apr. 28, 2020; 9 pages.
https://jingyan.baidu.com/article/27fa73265c7f3e46f8271fbb.html; "How does Douyin search for the video he wants to watch?"; Jun. 2018; accessed Apr. 28, 2020; 5 pages.
Techvilla; "How to Use Cheez App, kaise use kare, download video"; https://www.youtube.com/watch?v=7k_GTZpdrOw; YouTube; Dec. 2017; accessed Mar. 31, 2022; 3 pages.

* cited by examiner

METHOD AND DEVICE FOR SEARCH PAGE INTERACTION, TERMINAL AND STORAGE MEDIUM

The present application is a continuation of International Patent Application No. PCT/CN2018/124774, filed on Dec. 28, 2018, which claims priority to Chinese Patent Application No. 201810738485.2, filed on Jul. 6, 2018 with the Chinese Patent Office, both of which are incorporated herein by reference in their entireties.

FIELD

The present disclosure relates to the field of internet technology, for example, to a method for search page interaction, a device for search page interaction, a terminal and a storage medium.

BACKGROUND

With the development and the popularity of internet technologies and intelligent devices, users can conveniently use multiple types of clients to search for content of interest to them.

According to relative technologies, when a user performs search by use of a client software, only content related to the search, such as a search bar and top search terms, is provided in the search interface, which doesn't guide a user in a perfect way, thereby user experience is poor.

SUMMARY

Below is a summary of the subject described in detail in the present disclosure. The summary does not intend to limit the protection scope of claims.

According to embodiments of the present disclosure, a method for search page interaction, a device for search page interaction, a terminal and a storage medium are provided to solve a problem in conventional technologies that only a search bar and top search terms are provided in the search interface.

In a first aspect, a method for search page interaction is provided according to an embodiment of the disclosure. The method includes: in response to a first preset operation on a search control in a current display interface, switching the current display interface to a search interface and displaying at least one subject of recommended content in the search interface and displaying a dynamic thumbnail of at least one video corresponding to each subject of recommended content under the subject of recommended content; in response to a second preset operation on a target subject of recommended content, jumping to a detail page corresponding to the target subject of recommended content; and in response to a third preset operation on a dynamic thumbnail of a target video, jumping to a play interface of the target video.

In a second aspect, a device for search page interaction is provided according to an embodiment of the disclosure. The device includes: a switch display module, a first jump module and a second jump module. The switch display module is configured to, in response to a first preset operation on a search control in a current display interface, switch the current display interface to a search interface and display at least one subject of recommended content in the search interface and display a dynamic thumbnail of at least one video corresponding to each subject of recommended content under the subject of recommended content. The first jump module is configured to, in response to a second preset operation on a target subject of recommended content, jump to a detail page corresponding to the target subject of recommended content. The second jump module is configured to, in response to a third preset operation on a dynamic thumbnail of a target video, jump to a play interface of the target video.

In a third aspect, a terminal is provided according to an embodiment of the disclosure. The terminal includes: at least one controller; and a memory configured to store at least one program. The at least one program, when executed by the at least one controller, causes the at least one controller to perform the method for search page interaction according to any one of embodiments of the disclosure.

In a fourth aspect, a computer readable storage medium storing computer programs is provided according to an embodiment of the disclosure. The computer programs, when executed by a processor, cause the processor to perform the method for search page interaction according to any one of embodiments of the disclosure.

Other aspects of the disclosure may be learned after detail descriptions and drawings are read and understood.

DETAILED DESCRIPTION

The present disclosure is described in detail below in conjunction with drawings and embodiments. It should be understood that specific embodiments described here are used to explain the present disclosure, but not to limit the present disclosure. It also should be noted that, for easy of description, the drawings merely show partial structures related to the present disclosure rather than all structures.

Figure 1A:
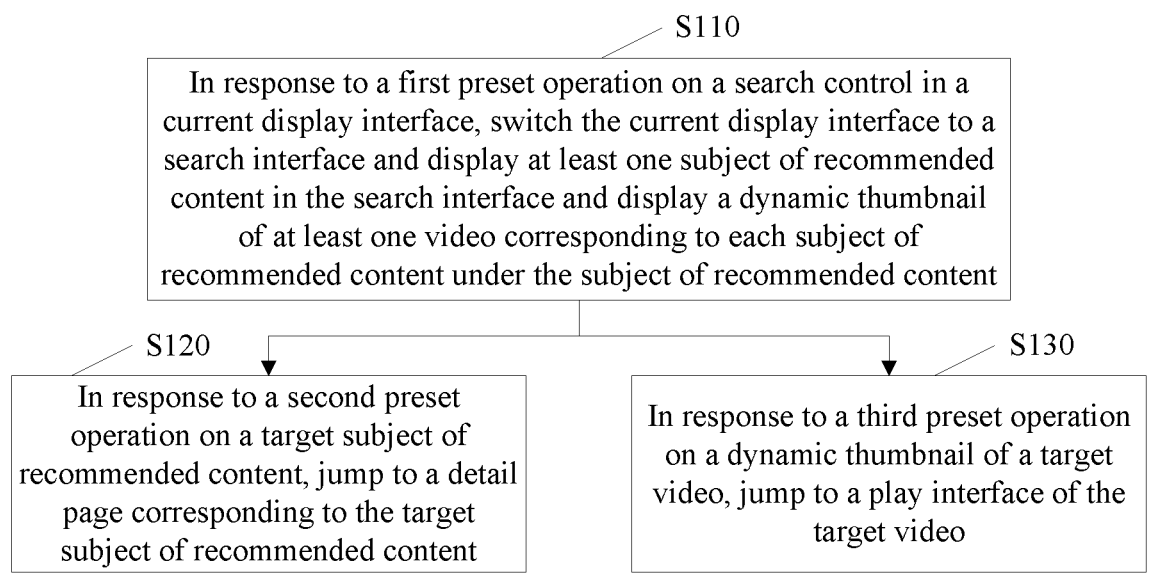
FIG. 1a is a schematic flowchart of a method for search page interaction according to an embodiment of the present disclosure.

FIG. 1a is a flowchart of a method for search page interaction according to an embodiment of the present disclosure. The present embodiment may be applied to a case that content of interest to users is recommended to users by improving and enriching functions for guiding uses in the search interface. The method may be performed by a device for search page interaction. The device may be implemented in at least one of a software manner and a hardware manner. The device may be provided in any terminal with a network communication function and cameras, such as a mobile phone and a tablet computer.

As shown in FIG. 1a, the method for search page interaction according to an embodiment of the present disclosure includes step 110, step 120 and step 130.

In step 110, in response to a first preset operation on a search control in a current display interface, the current display interface is switched to a search interface and at least one subject of recommended content is displayed in the search interface and a dynamic thumbnail of at least one video corresponding to each subject of recommended content is displayed under the subject of recommended content.

According to an embodiment of the present disclosure, the first preset operation, a second preset operation or a third preset operation may be any one of a click operation, a double click operation or a long press operation, which are not limited herein.

For example, the first preset operation may be a click operation. In a process that a user searches by a client, when it is detected that the user clicks the search control in the current display interface, the current display interface is switched to the search interface. The current display interface is, for example, a video play interface. For example, it is determined whether a current network is normal by the terminal when the current display interface is switched to the search interface. In a case that the current network is not normal, the user is provided with a network connection failure prompt. In a case that the current network is normal, the recommended content is displayed in the form of subjects.

Figure 1B:
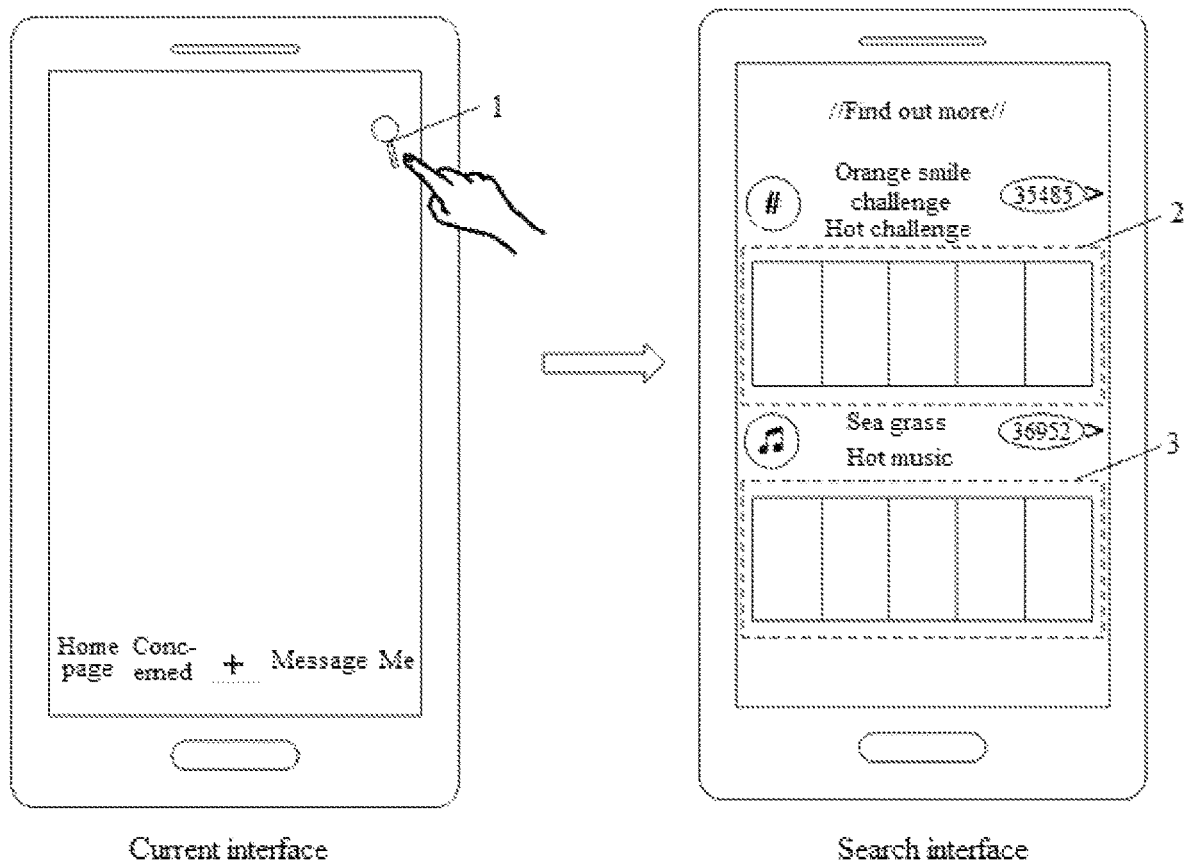
FIG. 1b is a schematic diagram showing an effect of switching a current display interface to a search interface according to an embodiment of the present disclosure.

For example, reference is made to FIG. 1b, which is a diagram showing an effect of switching the current display interface to a search interface. The current display interface is switched to the search interface when the user clicks the search control 1. Multiple subjects of recommended content are displayed under the label of "Find out more" in the search interface. A display area is displayed under every subject of recommended content, such as an area 2 and an area 3, which are configured to display a dynamic thumbnail of at least one video corresponding to the subject. The dynamic thumbnail of the at least one video are displayed in sequence in a horizontal direction under the subject corresponding to the video. The recommended content includes challenges or music recommended according to a user persona. Specifically, label information of the user persona is determined according to a search histories of the user, and challenges or music of interest to the user are recommended to the user according to the label information. Besides, the number of people anticipating each challenge or music is displayed in the right of the subject of the challenge or music.

In step S120, in response to a second preset operation on a target subject of recommended content, it is jumped to a detail page corresponding to the target subject of recommended content.

According to the present embodiment, the second preset operation may be a click operation, the target subject of recommended content may be any subject of challenges or music in the search interface. If it is detected that the user clicks any subject of challenges or music, the search interface is jumped to a detail page corresponding to the clicked subject of the challenges or music.

Figure 1C:
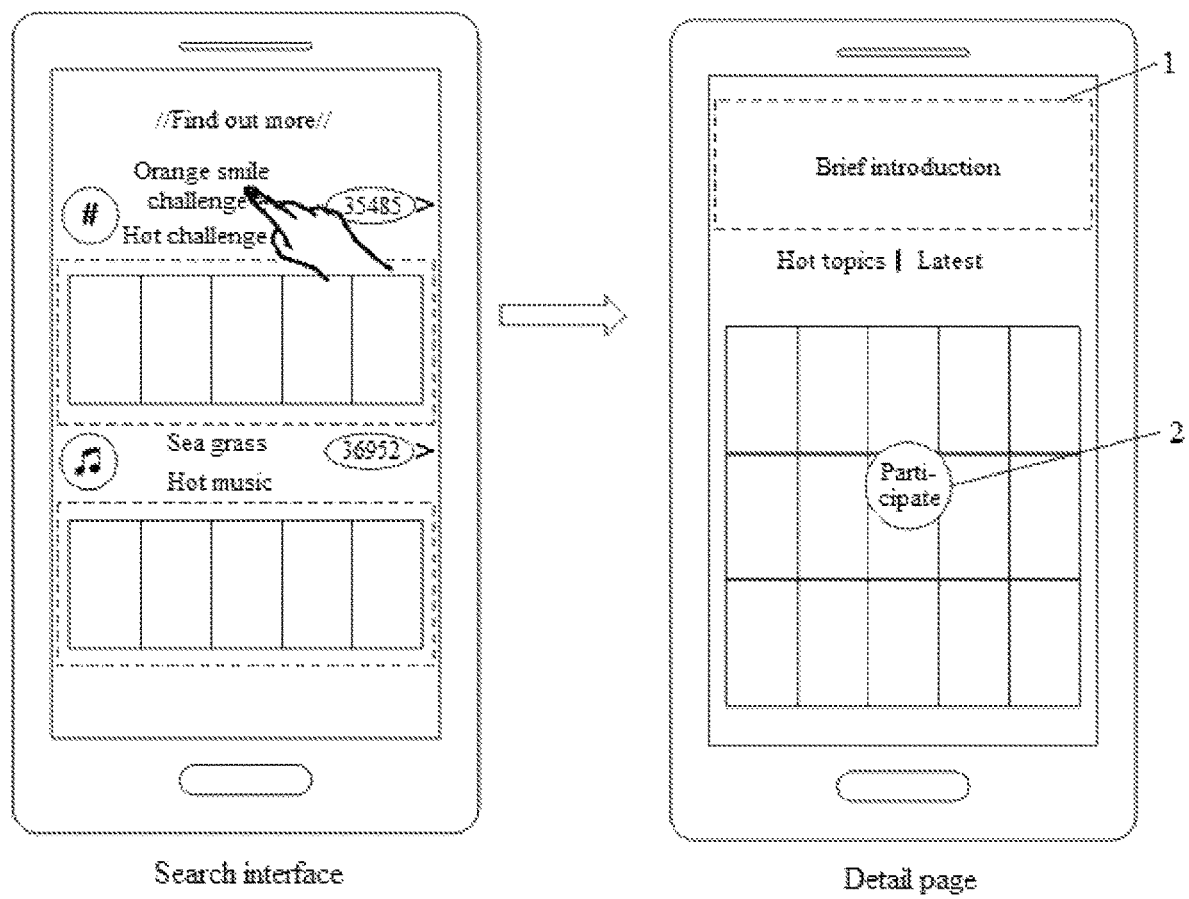
FIG. 1c is a schematic diagram showing an effect of jumping from a search interface to a detail page corresponding to a challenge subject according to an embodiment of the present disclosure.

For example, as shown in FIG. 1c, it is jumped to a detail page corresponding to the subject of challenge "orange smile challenge" when the user clicks the subject of challenge "orange smile challenge". An area 1 in the top of the detail page is configured to display a brief introduction of the challenge content. A "hot topics" label and a "latest" label are displayed under the area 1. Dynamic thumbnails of videos corresponding to the subject associated with each label are displayed under the label, so that the user can view dynamic thumbnails of videos under the label by clicking different labels. A participation control 2 is provided in the detail page corresponding to the subject of challenge. The user may enter a shoot interface by clicking the participation control 2 to shoot a video with the subject of challenge. Accordingly, a participation control similar to the participation control 2 is provided in the page detail corresponding to the subject of music. The user may enter the shoot interface by clicking the participation control to shoot a video corresponding to the subject of music.

In step 130, in response to a third preset operation on a dynamic thumbnail of a target video, it is jumped to a play interface of the target video.

According to an embodiment of the present disclosure, the third preset operation may be a click operation, and the dynamic thumbnail of the target video is the dynamic thumbnail of any video displayed under the any subject of challenges or music. When it is detected that the user clicks the dynamic thumbnail of the target video, it is jumped to the play interface of the target video, to play the target video.

According to the embodiment of the present disclosure, step 120 and step 130 are coordinate and not ordered.

In the present embodiment, in response to a click operation on the search control in the current display interface performed by the user, it is switched to the search interface to display multiple subjects of recommended content in the search interface and display the dynamic thumbnail of at least one video corresponding to each subject of recommended content under the subject of recommended content. In response to a click operation on any subject of recommended content performed by the user, it is jumped to a detail page corresponding to the subject. In response to a click operation on the dynamic thumbnail of any video performed by the user, it is jumped to a play interface of the video. According to the embodiment of the present disclosure, content of interest to the user is recommended to the user for selection, thereby improving the user experience.

Figure 2:
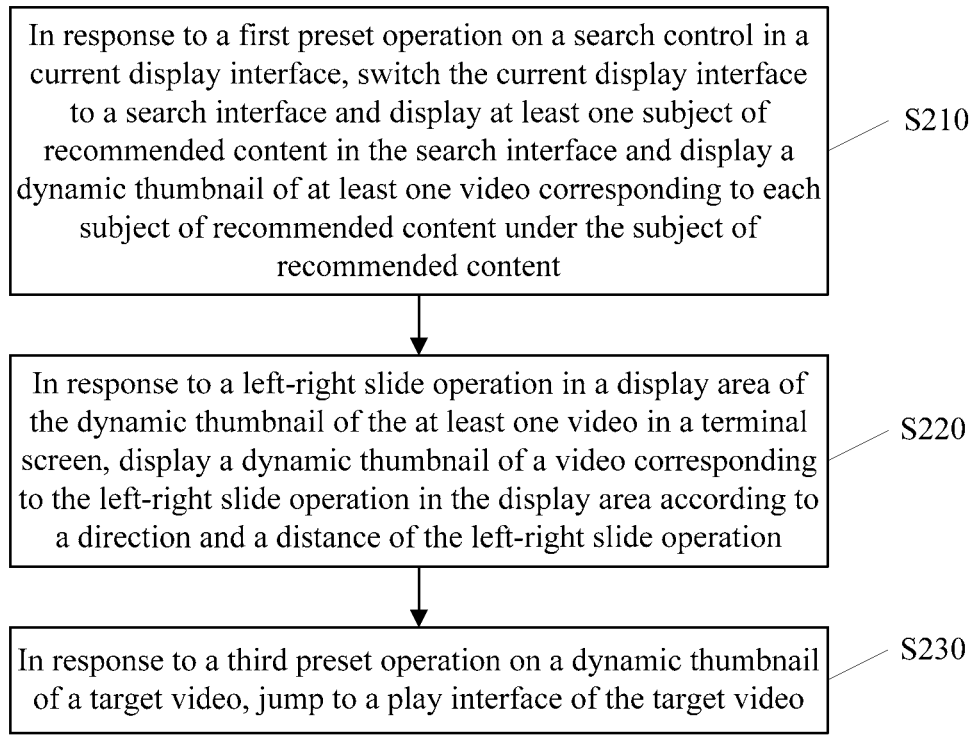
FIG. 2 is a schematic flowchart of a method for search page interaction according to an embodiment of the present disclosure.

FIG. 2 is a schematic flowchart of a method for search page interaction according to an embodiment of the present disclosure. The present embodiment is a refinement based on above-mentioned embodiments. The method for search page interaction according to the present embodiment includes step S210, step S220 and step S230.

In step 210, in response to a first preset operation on a search control in a current display interface, the current display interface is switched to a search interface and at least one subject of recommended content is displayed in the search interface and a dynamic thumbnail of at least one video corresponding to each subject of recommended content is displayed under the subject of recommended content.

In step 220, in response to a left-right slide operation in a display area of the dynamic thumbnail of the at least one video in a terminal screen, a dynamic thumbnail of a video corresponding to the left-right slide operation is displayed in the display area according to a direction and a distance of the left-right slide operation.

According to the present embodiment, a display area is arranged under each subject of recommended content, and the display area is configured to display a dynamic thumbnail of at least one video corresponding to the subject. If a left-right slide operation is detected in a display area, for example, the left-right slide operation may be determined based on a change in capacitance of a capacitive touch screen of a terminal, in this case, dynamic thumbnails of videos displayed in the display area may be moved according to the direction and the distance of the left-right slide operation, so that the user may select a video which the user likes from the dynamic thumbnails of videos.

In step 230, in response to a third preset operation on a dynamic thumbnail of a target video, it is jumped to a play interface of the target video.

According to the present embodiment, after the search interface is entered, it is detected the left-right slide operation performed by the user in a display area under any subject, and the dynamic thumbnails of videos displayed in the display area are moved according to the left-right slide operation, so that the user may select a video which the user likes, to play the selected video.

Figure 3A:
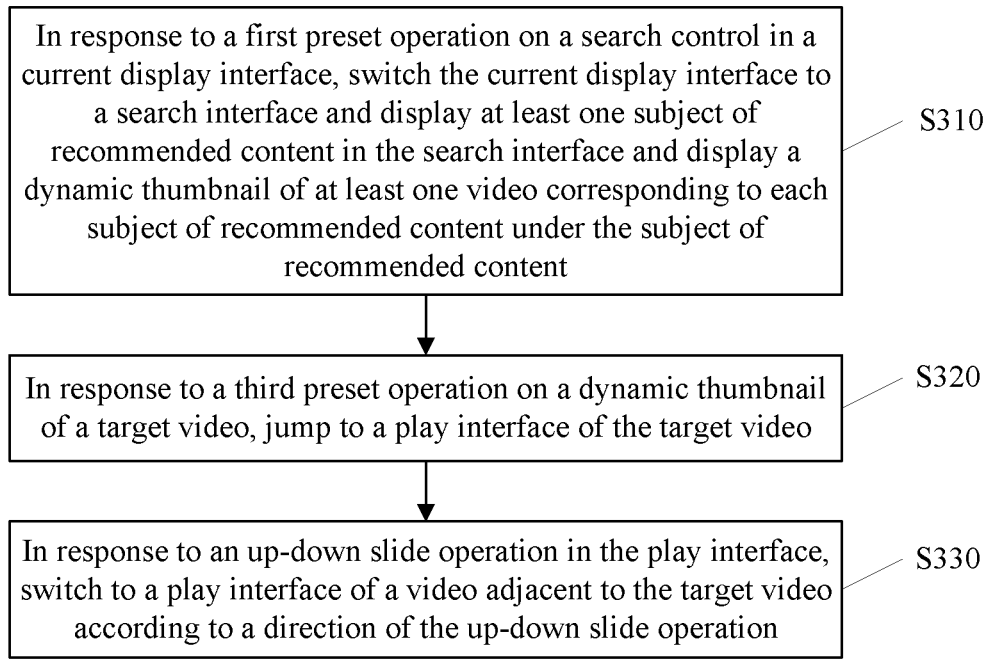
FIG. 3a is a schematic flowchart of a method for search page interaction according to an embodiment of the present disclosure.

FIG. 3a is a schematic flowchart of a method for search page interaction according to an embodiment of the present disclosure. The present embodiment is a refinement based on above-mentioned embodiments. The method for search page interaction according to the present embodiment includes step S310, step S320 and step S330.

In step 310, in response to a first preset operation on a search control in a current display interface, the current display interface is switched to a search interface and at least one subject of recommended content is displayed in the search interface and a dynamic thumbnail of at least one video corresponding to each subject of recommended content is displayed under the subject of recommended content.

In step 320, in response to a third preset operation on a dynamic thumbnail of a target video, it is jumped to a play interface of the target video.

In step 330, in response to an up-down slide operation in the play interface, it is switched to a play interface of a video adjacent to the target video according to a direction of the up-down slide operation.

Figure 3B:
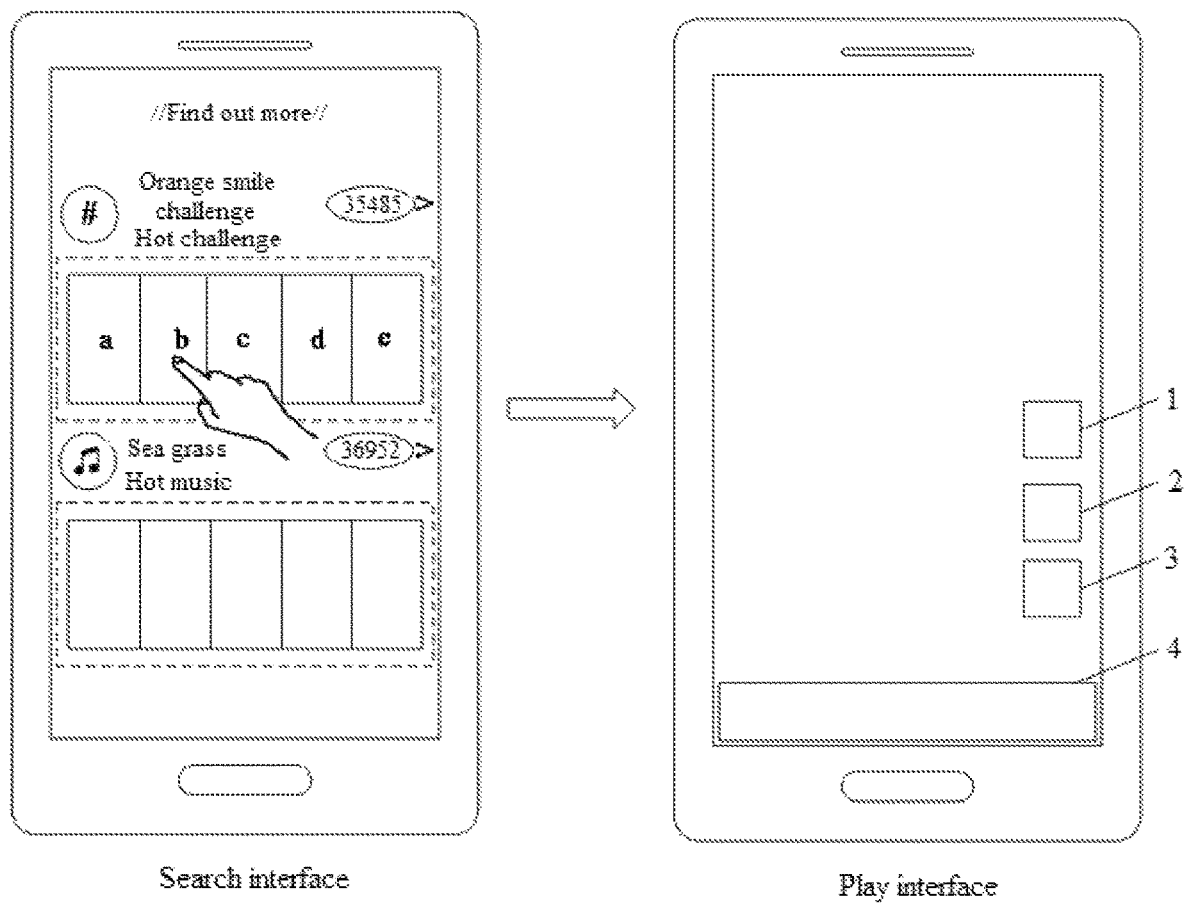
FIG. 3b is a schematic diagram showing an effect of switching a search interface to a video play interface according to an embodiment of the present disclosure.

According to the present embodiment, when a play interface of the target video is entered, if it is detected an up-down slide operation performed by a user in the display interface, for example, the up-down slide operation may be determined based on the change in capacitance of the capacitive touch screen, in this case, it is switched to a play interface of a video adjacent to the target video. For example, reference is made to FIG. 3b, which is a schematic diagram showing an effect of jumping from a search interface to a play interface. Dynamic thumbnails a, b and c are adjacent. If the user clicks the dynamic thumbnail b, a video corresponding to the dynamic thumbnail b is played in the play interface. An author information control 1 about the information of the author uploading the video, a comment view control 2, a forwarding control 3, a comment box 4 and the like are displayed in the play interface. If an up slide operation is detected in the play interface, it is switched to a play interface of the dynamic thumbnail c, to play a video corresponding to the dynamic thumbnail c. If a down slide operation is detected in the play interface, it is switched to a play interface of the dynamic thumbnail a, to play a video corresponding to the dynamic thumbnail a. By that analogy, corresponding videos are played according to the up-down slide operation performed by the user.

According to the present embodiment, after a play interface is entered, different videos are switched to play according to the detected up-down slide operation, the operation is simple and convenient, so that the user may select a video which the user likes, according to content of videos.

Figure 4:
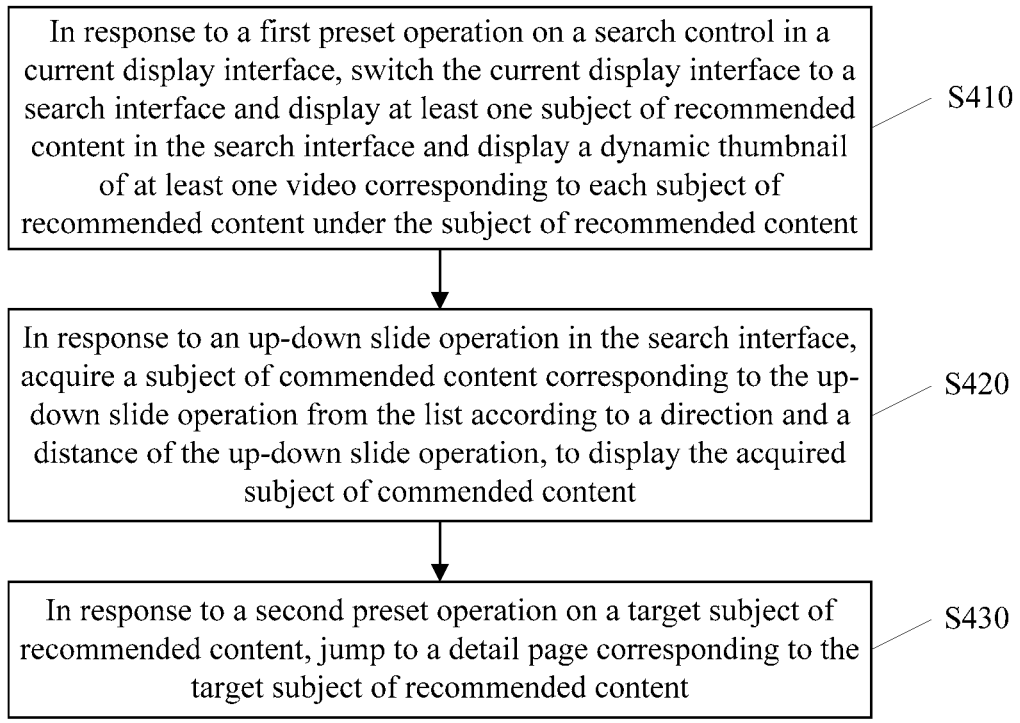
FIG. 4 is a schematic flowchart of a method for search page interaction according to an embodiment of the present disclosure.

FIG. 4 is a schematic flowchart of a method for search page interaction according to an embodiment of the present disclosure. The present embodiment is a refinement based on above-mentioned embodiments. The method for search page interaction according to the present embodiment includes step S410, step S420 and step S430.

In step 410, in response to a first preset operation on a search control in a current display interface, the current display interface is switched to a search interface and at least one subject of recommended content is displayed in the search interface and a dynamic thumbnail of at least one video corresponding to each subject of recommended content is displayed under the subject of recommended content.

According to the present embodiment, the at least one subject of recommended content is displayed in form of a list in the search interface.

In step 420, in response to an up-down slide operation in the search interface, a subject of commended content corresponding to the up-down slide operation is acquired from the list according to a direction and a distance of the up-down slide operation, to display the acquired subject of commended content.

According to the present embodiment, after the search interface is entered, in response to the up-down slide operation in the search interface, a subject of commended content corresponding to the up-down slide operation is acquired from the list according to a direction and a distance of the up-down slide operation, to display the acquired subject of commended content. For example, if an up slide operation performed by the user is detected, a request for acquiring more recommended content is sent to a server, so that a terminal displays more recommended content in the search interface according to recommended content data sent by the server.

In step 430, in response to a second preset operation on a target subject of recommended content, it is jumped to a detail page corresponding to the target subject of recommended content.

According to the present embodiment, after the search interface is entered, more recommended content is loaded and displayed in the search interface by detecting the up-down slide operation performed by the user, so that the user may select a video which the user likes, to view the selected video.

Figure 5:
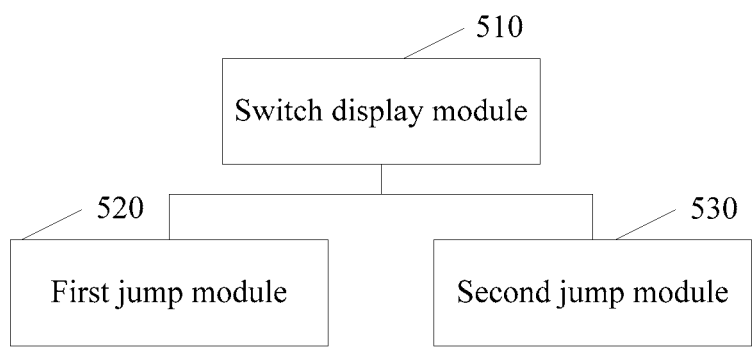
FIG. 5 is a schematic structural diagram of a device for search page interaction according to an embodiment of the present disclosure.

FIG. 5 is a schematic structural diagram of a device for search page interaction according to an embodiment of the present disclosure. As shown in FIG. 5, the device includes a switch display module 510, a first jump module 520 and a second jump module 530.

The switch display module 510 is configured to, in response to a first preset operation on a search control in a current display interface, switch the current display interface to a search interface and display at least one subject of recommended content in the search interface and display a dynamic thumbnail of at least one video corresponding to each subject of recommended content under the subject of recommended content.

The first jump module 520 is configured to, in response to a second preset operation on a target subject of recommended content, jump to a detail page corresponding to the target subject of recommended content.

The second jump module 530 is configured to, in response to a third preset operation on a dynamic thumbnail of a target video, jump to a play interface of the target video.

According to the device for search page interaction provided in the present embodiment, the switch display module 510 switches a current interface to a search interface and displays multiple subjects of recommended content in the search interface and displays dynamic thumbnails of multiple videos corresponding to each subject. The first jump module 520 and the second jump module 530 perform jumping based on click operations performed by the user, to display details of content of interest to the user. In this way, content of interest to the user is recommended to the user for selection, thereby improving the user experience.

On the basis of the above-mentioned embodiments, the recommended content includes challenges or music recommended according to a user persona.

On the basis of the above-mentioned embodiments, the dynamic thumbnail of the at least one video is displayed in sequence under the subject of recommended content corresponding to the video.

On the basis of the above-mentioned embodiments, the device further includes a first display module configured to, in response to a left-right slide operation in a display area of the dynamic thumbnail of the at least one video in a terminal screen, display a dynamic thumbnail of a video corresponding to the left-right slide operation in the display area according to a direction and a distance of the left-right slide operation.

On the basis of the above-mentioned embodiments, the device further includes a video switch module configured to, in response to an up-down slide operation in the play interface, switch to a play interface of a video adjacent to the target video according to a direction of the up-down slide operation.

On the basis of the above-mentioned embodiments, the at least one subject of recommended content is displayed in form of a list in the search interface.

Accordingly, the device further includes a second display module configured to, in response to an up-down slide operation in the search interface, acquire a subject of commended content corresponding to the up-down slide operation from the list according to a direction and a distance of the up-down slide operation, to display the acquired subject of commended content.

On the basis of the above-mentioned embodiments, the first preset operation, the second preset operation or the third preset operation includes a click operation, a double click operation or a long press operation.

The device for search page interaction according to embodiments of the present disclosure can perform the method for search page interaction according to any one embodiment of the present disclosure, and has function modules for performing the method.

Figure 6:
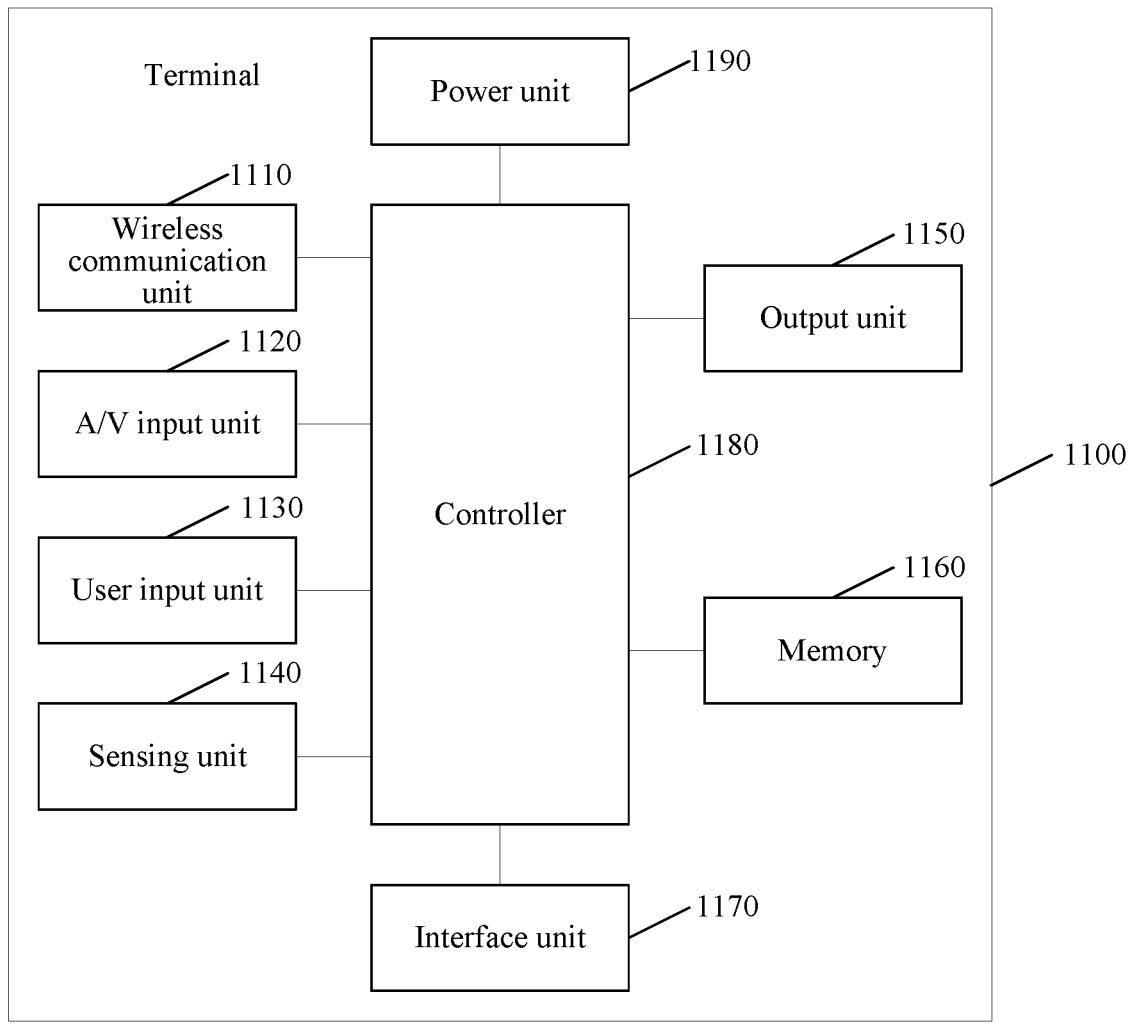
FIG. 6 is a schematic structural diagram of a terminal according to an embodiment of the present disclosure.

FIG. 6 is a schematic diagram showing the hardware structure of a terminal according to an embodiment of the present disclosure. The terminal may be implemented in various manners. The terminal in the embodiment of the disclosure may include, but is not limited to, mobile terminal devices such as a mobile phone, a smart phone, a notebook computer, a digital broadcast receiver, a Personal Digital Assistant (PDA), a tablet computer, a Portable Media Player (PMP), a navigation device, an in-vehicle terminal device, an in-vehicle display terminal, an in-vehicle electronic rear-view mirror and fixed terminal devices such as a digital TV, a desktop computer.

As shown in FIG. 6, the terminal 1100 may include a wireless communication unit 1110, an Audio/Video (A/V) input unit 1120, a user input unit 1130, a sensing unit 1140, an output unit 1150, a memory 1160, an interface unit 1170, a controller 1180, a power unit 1190, and the like. FIG. 6 shows a terminal with various components. However, it should be understood that it's not required to implement all shown components, more or less components may be implemented alternatively.

The wireless communication unit 1110 establishes wireless communication between the terminal 1100 and a wireless communication system or a network. The A/V input unit 1120 is configured to receive an audio signal or a video signal. The user input unit 1130 may generate input data based on a command inputted by a user, to control various operations of the terminal. The sensing unit 1140 is configured to detect a current state of the terminal 1100, a location of the terminal 1100, whether the user touches the terminal 1100 to generate an input, an orientation of the terminal 1100, an acceleration or deceleration movement and direction of the terminal 1100. In addition, the sensing unit 1140 is also configured to generate a command or signal for controlling operations of the terminal 1100. The interface unit 1170 is used as an interface by which at least one external device can connect with the terminal 1100. The output unit 1150 is configured to provide an output signal in at least one of a visual manner, an audio manner or a tactile manner. The memory 1160 may store the process executed by the controller 1180, software programs for controlling operations, or the like. The memory 1160 may also temporarily store data which has been outputted or which is to be outputted. The memory 1160 may include at least one type of storage medium. The terminal 1100 can collaborate with a network storage device which executes a storage function of the memory 1160 by network connections. The controller 1180 usually controls overall operations of the terminal. In addition, the controller 1180 may include a multimedia module configured to reappear or playback multimedia data. The controller 1180 may execute a pattern recognition process, to recognize a handwriting input or a picture drawing input performed on the touch screen as a character or an image. Under the control of the controller 1180, the power unit 1190 receives an external electric power or an inner electric power and provides a proper electric power for operating various elements and components.

The controller 1180 executes software programs stored in the system memory 1160 to control the overall operations of the terminal, for example, to perform a method for search page interaction the disclosure. The method includes: in response to a first preset operation on a search control in a current display interface, switching the current display interface to a search interface and displaying at least one subject of recommended content in the search interface and displaying a dynamic thumbnail of at least one video corresponding to each subject of recommended content under the subject of recommended content; in response to a second preset operation on a target subject of recommended content, jumping to a detail page corresponding to the target subject of recommended content; and in response to a third preset operation on a dynamic thumbnail of a target video, jumping to a play interface of the target video.

According to an embodiment of the present disclosure, a storage medium including computer executable instructions is provided. The computer executable instructions, when executed by a processor of a computer, cause the processor to perform a method for search page interaction applied to a terminal. The method includes: in response to a first preset operation on a search control in a current display interface, switching the current display interface to a search interface and displaying at least one subject of recommended content in the search interface and displaying a dynamic thumbnail of at least one video corresponding to each subject of recommended content under the subject of recommended content; in response to a second preset operation on a target subject of recommended content, jumping to a detail page corresponding to the target subject of recommended content; and in response to a third preset operation on a dynamic thumbnail of a target video, jumping to a play interface of the target video.

Apparently, for the storage medium including computer executable instructions provided according to the embodiment of the disclosure, the computer executable instructions are not limited to operations of the above method. The computer executable instructions can also execute relative operations in the text display method applied to the terminal according to any one of embodiments of the present disclosure.

The computer storage medium according to embodiments of the present disclosure may be any combination of at least one computer readable medium. The computer readable medium may be a computer readable signal medium or a computer readable storage medium. For example, the computer readable storage medium may be, but not limited to, an electronic, magnetic, optical, electromagnetic, infrared, or semiconductor system, apparatus, or device, or any combination of the above. More specific examples (non-exhaustive list) of the computer readable storage medium include: electrical connections having at least one wire, portable computer disk, hard disk, Random Access Memory (RAM), Read Only Memory (ROM), Electrically Erasable Programmable Read-Only Memory (EPROM) or flash memory, optical fiber, Compact Disc Read-Only Memory (CD-ROM), light storage device, a magnetic storage device, or any suitable combination of the above. In this disclosure, the computer readable storage medium may be any physical medium that contain or store programs. The programs may be used by an instruction execution system, an instruction execution apparatus or an instruction execution device or may be used in combination with the instruction execution system, the instruction execution apparatus and the instruction execution device.

The computer readable signal medium may include a data signal carrying computer readable program codes which are transmitted in a baseband or transmitted as a part of carrier. The transmitted data signal may has a variety of forms including, but not limited to, electromagnetic signals, optical signals, or any suitable combination of the foregoing. The computer readable signal medium may also be any other computer readable medium except for the computer readable storage medium. The computer readable medium can send, transmit or transfer programs configured to be used by an instruction execution system, an instruction execution apparatus or an instruction execution device or used in combination with the instruction execution system, the instruction execution apparatus and the instruction execution device.

The program codes included in the computer readable medium may be transferred by any proper medium including, but not limited to, wireless, electric wire, optical cable, RF and any proper combination of the above.

The computer program codes configured to perform the operations according to the present disclosure may be written in at least one programming language or the combination of the at least one programming language. The programming language includes object oriented programming language such as Java, Smalltalk, C++ and conventional procedural programming languages such as "C" programming language or programming languages similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The invention claimed is:

1. A method for search page interaction, comprising:
   detecting a selection of a first user interface element by a user after launching an application, wherein the first user interface element is a search control associated with searching and recommending content to the user;
   in response to the selection of the first user interface element by the user, presenting the content recommended to the user via a first interface, wherein the first interface comprises at least one subject of the content recommended to the user, the at least one subject comprises at least a text string, the at least one subject is selectable la selecting the text string, and the first interface further comprises at least one dynamic thumbnail corresponding to at least one video associated with the at least one subject and displayed in an area located under the at least one subject of the content;
   detecting a selection of a first subject of the content among the at least one subject of the content in the first interface;
   displaying a second interface associated with the first subject of the content in response to the selection of the first subject of the content, wherein the second interface is an interface comprising detailed information about the first subject of the content, the second interface comprises a first area of displaying an introduction of the content, the second interface comprises at least one selectable button displayed under the first area, the second interface comprises a plurality of dynamic thumbnails displayed under the at least one selectable button, and the second interface comprises a second user interface element overlaid on at least one of the plurality of dynamic thumbnails and selectable for switching to an interface of shooting a new video associated with the first subject of the content;
   in response to detecting a selection of a first dynamic thumbnail corresponding to a first video among the at least one dynamic thumbnail in the first interface, displaying a third interface of playing the first video; and
   in response to detecting an up-down slide operation on the third interface of playing the first video corresponding to the first dynamic thumbnail in the first interface, displaying a fourth interface of playing a second video corresponding to a second dynamic thumbnail among the at least one dynamic thumbnail in the first interface, wherein the first dynamic thumbnail and the second dynamic thumbnail are displayed adjacent to each other in the first interface.

2. The method according to claim 1, wherein the recommended content comprises challenges or music recommended according to a user persona.

3. The method according to claim 1, wherein the at least one dynamic thumbnail corresponding to the at least one video is displayed in sequence under a subject among the at least one subject of recommended content with which the at least one video is associated.

4. The method according to claim 1, further comprising:
in response to a left-right slide operation in a display area of displaying the at least one dynamic thumbnail corresponding to the at least one video in a terminal screen, displaying at least a subset of the at least one dynamic thumbnail corresponding to the at least one video based on a direction and a distance of the left-right slide operation in the display area.

5. The method according to claim 1, wherein there is a predetermined corresponding relationship between a display position of the second dynamic thumbnail relative to the first dynamic thumbnail in the first interface and a direction of the up-down slide operation on the third interface.

6. The method according to claim 1, wherein the at least one subject of recommended content is displayed in form of a list in the first interface; and the method further comprises:
in response to an up-down slide operation on the list in the first interface, acquiring at least a subset of the at least one subject of recommended content based on a direction and a distance of the up-down slide operation; and
displaying the acquired at least a subset of the at least one subject of recommended content.

7. The method according to claim 1, wherein the selection of the first user interface element is made using a first preset operation, and the first preset operation comprises a click operation, a double click operation or a long press operation.

8. A terminal, comprising:
at least one processor; and
at least one memory communicatively coupled to the at least one processor and storing instructions that upon execution by the at least one processor cause the terminal to:
detect a selection of a first user interface element by a user after launching an application, wherein the first user interface element is a search control associated with searching and recommending content to the user;
in response to the selection of the first user interface element by the user, present the content recommended to the user via a first interface, wherein the first interface comprises at least one subject of the content recommended to the user, the at least one subject comprises at least a text string, the at least one subject is selectable by selecting the text string, and the first interface further comprises at least one dynamic thumbnail corresponding to at least one video associated with the at least one subject and displayed in an area located under the at least one subject of the content;
detect a selection of a first subject of the content among the at least one subject of the content in the first interface;
display a second interface associated with the first subject of the content in response to the selection of the first subject of the content, wherein the second interface is an interface comprising detailed information about the first subject of the content, the second interface comprises a first area of displaying an introduction of the content, the second interface comprises at least one selectable button displayed under the first area, the second interface comprises a plurality of dynamic thumbnails displayed under the at least one selectable button, and the second interface comprises a second user interface element overlaid on at least one of the plurality of dynamic thumbnails and selectable for switching to an interface of shooting a new video associated with the first subject of the content;
in response to detecting a selection of a first dynamic thumbnail corresponding to a first video among the at least one dynamic thumbnail in the first interface, display a third interface of playing the first video; and
in response to detecting an up-down slide operation on the third interface of playing the first video corresponding to the first dynamic thumbnail in the first interface, display a fourth interface of playing a second video corresponding to a second dynamic thumbnail among the at least one dynamic thumbnail in the first interface, wherein the first dynamic thumbnail and the second dynamic thumbnail are displayed adjacent to each other in the first interface.

9. The terminal according to claim 8, wherein the recommended content comprises challenges or music recommended according to a user persona.

10. The terminal according to claim 8, wherein the at least one dynamic thumbnail corresponding to the at least one video is displayed in sequence under a subject among the at least one subject of recommended content with which the at least one video is associated.

11. The terminal according to claim 8, wherein the at least one memory further stores instructions that upon execution by the at least one processor cause the terminal to:
in response to a left-right slide operation in a display area of displaying the at least one dynamic thumbnail corresponding to the at least one video in a terminal screen, display at least a subset of the at least one dynamic thumbnail corresponding to the at least one video based on a direction and a distance of the left-right slide operation in the display area.

12. The terminal according to claim 8, wherein there is a predetermined corresponding relationship between a display position of the second dynamic thumbnail relative to the first dynamic thumbnail in the first interface and a direction of the up-down slide operation on the third interface.

13. The terminal according to claim 8, wherein the at least one subject of recommended content is displayed in form of a list in the first interface and wherein the at least one memory further stores instructions that upon execution by the at least one processor cause the terminal to:
in response to an up-down slide operation on the list in the first interface, acquire at least a subset of the at least one subject of recommended content based on a direction and a distance of the up-down slide operation; and
display the acquired at least a subset of the at least one subject of recommended content.

14. The terminal according to claim 8, wherein the selection of the first user interface element is made using a first preset operation, and the first preset operation comprises a click operation, a double click operation or a long press operation.

15. A non-transitory computer readable storage medium having stored thereon non-transitory computer readable instructions that, when executed by a computer, cause the computer to perform operations, the operations comprising:
detecting a selection of a first user interface element by a user after launching an application, wherein the first user interface element is a search control associated with searching and recommending content to the user;
in response to the selection of the first user interface element by the user, presenting the content recommended to the user via a first interface, wherein the first interface comprises at least one subject of the content recommended to the user, the at least one subject comprises at least a text string, the at least one subject is selectable by selecting the text string, and the first interface further comprises at least one dynamic thumbnail corresponding to at least one video associated with the at least one subject and displayed in an area located under the at least one subject of the content;

detecting a selection of a first subject of the content among the at least one subject of the content in the first interface;

displaying a second interface associated with the first subject of the content in response to the selection of the first subject of the content, wherein the second interface is an interface comprising detailed information about the first subject of the content, the second interface comprises a first area of displaying an introduction of the content, the second interface comprises at least one selectable button displayed under the first area, the second interface comprises a plurality of dynamic thumbnails displayed under the at least one selectable button, and the second interface comprises a second user interface element overlaid on at least one of the plurality of dynamic thumbnails and selectable for switching to an interface of shooting a new video associated with the first subject of the content;

in response to detecting a selection of a first dynamic thumbnail corresponding to a first video among the at least one dynamic thumbnail in the first interface, displaying a third interface of playing the first video; and in response to detecting an up-down slide operation on the third interface of playing the first video corresponding to the first dynamic thumbnail in the first interface, displaying a fourth interface of playing a second video corresponding to a second dynamic thumbnail among the at least one dynamic thumbnail in the first interface, wherein the first dynamic thumbnail and the second dynamic thumbnail are displayed adjacent to each other in the first interface.

16. The non-transitory computer readable storage medium of claim 15, wherein the recommended content comprises challenges or music recommended based on a user persona.

17. The non-transitory computer readable storage medium of claim 15, wherein the at least one dynamic thumbnail corresponding to the at least one video is displayed in sequence under a subject among the at least one subject of recommended content with which the at least one video is associated.

18. The non-transitory computer readable storage medium of claim 15, the operations further comprising:

in response to a left-right slide operation in a display area of displaying the at least one dynamic thumbnail corresponding to the at least one video in a terminal screen, displaying at least a subset of the at least one dynamic thumbnail corresponding to the at least one video based on a direction and a distance of the left-right slide operation in the display area.

19. The non-transitory computer readable storage medium of claim 15, wherein there is a predetermined corresponding relationship between a display position of the second dynamic thumbnail relative to the first dynamic thumbnail in the first interface and a direction of the up-down slide operation on the third interface.

20. The non-transitory computer readable storage medium of claim 15, wherein the at least one subject of recommended content is displayed in form of a list in the first interface; and the operations further comprise:

in response to an up-down slide operation on the list in the first interface, acquiring at least a subset of the at least one subject of recommended content based on a direction and a distance of the up-down slide operation; and displaying the acquired at least a subset of the at least one subject of recommended content.

* * * * *